United States Patent [19]

Kataoka et al.

[11] Patent Number: 4,924,244
[45] Date of Patent: May 8, 1990

[54] LENS SYSTEM FOR PROJECTION TYPE TELEVISION

[75] Inventors: Hiroshi Kataoka, Yokohama; Kyohei Fukuda, Fujisawa, both of Japan

[73] Assignee: Hitachi, Ltd., Tokyo, Japan

[21] Appl. No.: 284,381

[22] Filed: Dec. 14, 1988

[30] Foreign Application Priority Data

Dec. 21, 1987 [JP] Japan .................. 62-321282

[51] Int. Cl.$^5$ ............................. G02B 27/18
[52] U.S. Cl. ......................... 350/432; 350/412; 350/463
[58] Field of Search ............ 350/463, 412, 432

[56] References Cited

U.S. PATENT DOCUMENTS

4,761,063  8/1988  Yoshioka et al. .............. 350/432

Primary Examiner—P. M. Dzierzynski
Attorney, Agent, or Firm—Antonelli, Terry, Stout & Kraus

[57] ABSTRACT

A lens system for a projection type television, having high focusing performance, a wide field angle and a reduced size. The lens system is composed of seven lenses, which are arranged successively from the screen side. The first lens, which is concave, and the second lens, which is convex, are cemented together to correct chromatic aberration. The third lens is a plastic lens for the correction of spherical aberration and astigmatism, at least one side of which is aspherical. The fourth lens, which is convex, and the fifth lens, which is concave, are cemented together to constitute an achromatic lens. In order to reduce the deterioration of focusing performance caused by changes in temperature, these two lenses are glass lenses and occupy the greater part of the power of the entire system. The sixth lens is an aspherical plastic lens for the correction of astigmatism and frame aberration, and the seventh lens is a plastic lens for the correction of image field curvature, using an aspherical surface.

7 Claims, 1 Drawing Sheet

LENS SYSTEM FOR PROJECTION TYPE TELEVISION

BACKGROUND OF THE INVENTION

The present invention relates to a lens system for a projection type television suitable for obtaining projection images of high quality.

Where the television screen is to be enlarged and the color cathode-ray tube of the type now available is made larger in size directly, there arise problems such as very high costs. Rather, a projection type television is more practical where an image on a cathode-ray tube is projected on the screen and enlarged through an optical system. However, in order to minimize the depth of a television set and effect a projection of a high definition image, it is necessary to use projection lenses of good characteristics.

For example, in U.S. Pat. Nos. 4,300,817 and 4,348,081 there are disclosed lens systems capable of realizing a brightness of 1.0 in terms of F-number using only three lenses. However, those lenses have a small field angle, which is about 50 degrees, so the projection distance becomes long and it is difficult to make the television set small in size.

On the other hand, in Japanese Patent Laid-Open No. 200216/1985 (U.S. Ser. No. 715,950 filed in March 1985) there is disclosed a lens system which can realize a wide field angle not smaller than 65 degrees though the number of lenses used is only three, thus greatly contributing to the reduction in size of the television set.

However, the above conventional lens systems are for the television screen according to the NTSC system which is now commonly adopted their performance, especially focusing performance, is unsatisfactory for projection reproduction of a television screen of high definition and high quality.

In the projection type television, reproduced images on three monochromatic cathode-ray tubes which function to reproduce only red, blue and green images respectively are projected in a superposed manner using an optical system, so it has generally been considered that chromatic aberration will not occur. Actually, however, chromatic aberration occurs because the phosphor of each monochromatic cathode-ray tube does not emit light at a specific wave length but rather emits light in a wavelength region of a certain range. In the lens systems disclosed in U.S. Pat. Nos. 4,300,817 and 4,348,081 and Japanese Patent Laid-Open No. 200216/85 aspherical lenses as used so spherical aberration is very small, resulting in chromatic aberration which is a great cause of deterioration in focusing performance. In the lens system disclosed in the Japanese patent laid-open 200216/85 it is intended to correct chromatic aberration by shortening the focal length, but the results are not satisfactory.

In connection with a high-quality image projection lens, a rear projection type display for Model 50 Hivision was made public in a 1986 TV Society National Meeting. This lens system comprises seven lenses using aspherical surfaces to reduce aberrations, including chromatic aberration, thereby realizing high focusing performance. However, due to a field angle of about 50 degrees, the projection distance is long and the depth of the set is large. Moreover, such a small field angle results in both the focal length and the lenses becoming larger, and this presents an obstacle to the reduction of cost.

According to the prior art, as noted above, it is impossible to simultaneously attain high focusing performance for high image quality, widening of field angle for reducing the depth of the set, and reduction in the size of lenses reduce cost at the same time.

List of prior applications:
U.S. Ser. No. 911,070 filed in September 1986
U.S. Ser. No. 948,251 filed in December 1986

SUMMARY OF THE INVENTION

It is the object of the present invention to provide a lens system capable of simultaneously attaining the above-mentioned three items which have heretofore been unattainable, by using aspherical and achromatic lenses, shortening the focal length and widening the field angle.

In order to achieve the above object, the lens system according to the present invention is composed of seven lenses which are arranged successively from the screen side. The first lens, which is concave, and the second lens, which is convex, are placed together to correct chromatic aberration. The third lens is a plastic lens for the correction of spherical aberration and astigmatism aberration, having an aspherical surface at least on one side thereof. The fourth lens, which is convex, and the fifth lens, which is concave, are stuck together to constitute an achromatic lens. These two lenses are glass lenses and occupy the greater part of the power of the entire system in order to reduce the deterioration of focusing performance caused by changes in temperature. The sixth lens is an aspherical plastic lens for the correction of astigmatism and frame aberration. The seventh lens is a plastic lens for the correction of curvature of image field, using an aspherical surface.

DESCRIPTION OF THE PREFERRED EMBODIMENT

The present invention employs plastic lenses using aspherical surfaces for attaining high focusing performance, and also employs a pair of achromatic lenses comprising convex and concave lenses with Abbe's number of the convex lens being larger than that of the concave lens, which paired lenses are used in two places, for the reduction of chromatic aberration. This is because of achromatizing is effected only in one place, the achromatic lens curvature will become very strong, with the result that it becomes difficult to realize the lens shape. Achromatizing and the reduction of monochromatic aberrations can be realized by attaching the following conditions to the Abbe's number, $v5$, at the d line of the fifth lens and also to the refractive index, $N_5$, at 545 nm:

$$v5 < 37.0 \qquad \qquad ①$$

$$N_5 \geqq 1.62 \qquad \qquad ②$$

If the radius of curvature of the stuck surface of the first and second lenses is $R_2$, that of the stuck surface of the fourth and fifth lenses is $R_7$ and the focal length of the entire system is f, $R_2$ and $R_7$ satisfy the following conditions in shape:

$$1.5 < R_2/f < 2.5 \quad (3)$$

$$0.5 < R_7/f < 1.0 \quad (4)$$

The fourth and fifth lenses are larger in lens power and smaller in aperture diameter than those of the first and second lenses, so it is possible to set $R_7$ smaller than $R_2$. If $R_2/f$ is below the lower limit in the expression (3), there will be deterioration in MTF (Modulation Transfer Function) of the marginal portion, while if $R_7/f$ is below the lower limit in the expression (4), the curvature will become stronger, making it difficult to realize the lens shape and at the same time there will be marked deterioration in monochromatic aberration. Exceeding the upper limits in the expressions (3) and (4) would result in the achromatizing effect being reduced.

A plastic lens is advantageous in that it is easy to make it aspherical due to the peculiarity of its manufacturing process, but is disadvantageous in that focus drifts due to changes in refractive index and shape caused by changes in temperature. In the present invention, the fourth and fifth lenses, which are glass lenses, are endowed with most of the power of the entire system to prevent deterioration in focusing performance caused by changes in temperature.

In order to decrease the depth of the set it is necessaryy to shorten the projection distance, that is, realize a wide field-angle lens. Widening of the field angle is attained by attaching the following conditions to the spacing, $T_{34}$, between the third and the fourth lens and the spacing, $T_{67}$, between the sixth and the seventh lens:

$$0.2 < T_{34}/f < 0.3 \quad (5)$$

$$0.2 < T_{67}/f < 0.4 \quad (6)$$

Generally, widening of the lens field angle gives rise to the problem that the marginal portion of the image plane becomes dark and aberration increases. In this connection, a surface shape $Z(r)$ at a distance, r, from an optical axis is defined as follows:

$$Z(r) = \frac{r^2/R_D}{1 + \sqrt{1 - (1 + CC)\frac{r^2}{R_D^2}}} + AD \cdot r^4 + AE \cdot r^6 + AF \cdot r^8 + AG \cdot r^{10}$$

wherein $R_D$ represents a radius of curvature on optical axis and CC, AD, AE, AF and AG represent aspherical co-efficients. Using $R_D$, the following is defined:

$$S(r) = \frac{r^2/R_D}{1 + \sqrt{1 - \frac{r^2}{R_D^2}}}$$

When $Z(r)$, $S(r)$ and aperture radius of the screen-side surface of lens are $Z_1(r)$, $S_1(r)$ and $r_1$, respectively, and $Z(r)$, $S(r)$ and aperture radius of the electron gun-side surface are $Z_2(r)$, $S_2(r)$ and $r_2$, respectively, the degree of asphericity, A, is defined as follows:

$$A = \{Z_1(r_1) - S_1(r_1)\} - \{Z_2(r_2) - S_2(r_2)\} \quad (7)$$

The degree of asphericity $A_3$ of the third lens and that $A_6$ of the sixth lens are determined so as to satisfy the following conditions:

$$-0.06 < A_3/f < -0.01 \quad (8)$$

$$-0.07 < A_6/f < -0.04 \quad (9)$$

By restricting the asphericity degree $A_3$ of the third lens to the range of the expression (8), spherical aberration and astigmatism are removed to diminish distortion, while by restricting the asphericity degree $A_6$ of the sixth lens to a value in the range of the expression (9), frame aberration and astigmatism occurring at the marginal portion of the screen are removed to diminish distortion.

When the asphericity degree $B_6$ is defined as follows using $Z(r)$, $S(r)$ and aperture radius $r_0$ on the electron gun side of the sixth lens:

$$B_6 = -\frac{Z(r_0) - S(r_0)}{S(r_0)} \quad (10)$$

the asphericity degree B is determined so as to be:

$$-1.6 < B_6 < -1.0$$

This condition is effective in diminishing distortion and ensuring the spacing between the marginal portion of the sixth lens and that of the seventh lens.

The lenses used in the present invention are small in size to reduce their cost. The lens brightness is generally represented in terms of F-number:

$$F = f/D$$

wherein D represents an effective lens aperture. By setting f small it was realized to make D small, that is, reduce the lens size, without changing the lens brightness.

Figure 1:
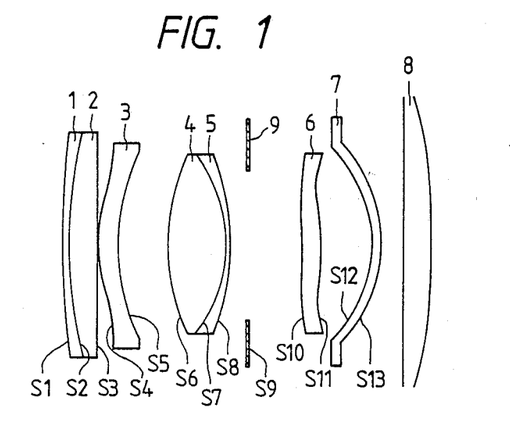
FIG. 1 is a longitudinal sectional view of a projection lens system embodying the present invention.

FIG. 1 shows the construction of the first embodiment of the present invention and Tables 1 shows lens data used therein. The lens system illustrated therein is composed of first to seventh lens and a CRT panel glass successively from the screen side. This lens system, which is for projection onto a type 50 screen, has a magnification of 9.5X, an F-number of 1.22, a focal length of 95.1 mm and a field angle of 64.4°.

The third lens is aspherical, having a concave meniscus shape near its central axis which is divergent toward the marginal portion. The sixth lens has a convex meniscus shape near its central axis, but its asphericity is strong, acting as a concave lens at the marginal portion. In addition to these third and sixth lenses, the seventh lens is also aspherical, whereby there are attained high focusing performance and wide field angle. Chromatic aberration is reduced by the achromatic, first, second, fourth and fifth lenses and the flare at the image plane edge portion is reduced by a diaphragm disposed between the fifth and the sixth lens. The space between the seventh lens and the CRT panel glass is filled with a refrigerant (comprising glycerin and ethylene glycol incorporated therein, abbreviated as EG+GL in the table) to prevent the increase in temperature of the fluorescent screen of the cathode-ray tube.

The fluorescent screen is aspherical, bent convexly toward the electron gun, and it serves to reduce the aberration of image field curvature and introduce the light at the image plane edge portion into lens as much as possible. As a result, 42% edge brightness could be ensured at a relative field angle of 90%.

Figure 2:
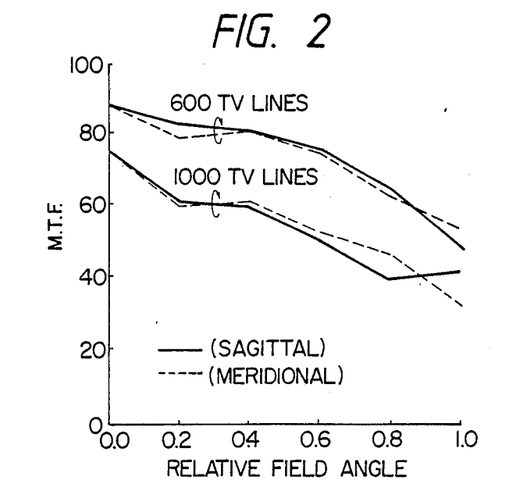
FIG. 2 is an MTF characteristic diagram in the first embodiment of the present invention.

FIG. 2 shows MTF at 600 TV lines and also at 1000 TV lines. These values were determined in consideration of the emission spectrum distribution of the phosphor, and wavelength weights are as set out in Table 2. It is seen that good MTF is obtained even at the image plane edge portion.

TABLE 2

| Wave Length (nm) | Weight |
|---|---|
| 490 | 0.2 |
| 545 | 0.6 |
| 590 | 0.2 |

Distortion is a maximum of 5.4% (focal distortion on the screen), which value can be reduced by correcting the image on the cathode-ray tube using an electric circuit.

Tables 3 to 7 show lens data in second to sixth embodiments. Basic constructions of lenses are the same as in the first embodiment. MTF characteristics at 600 and 1000 TV lines are also about the same as in the first embodiment.

In Table 8 there are shown Abbe's number $v_5$ at d line of the fifth lens, refractive index $N_5$ at 545 nm of the fifth lens, a value obtained by dividing the radius of curvature $R_2$ of the stuck surface of the first and second lenses by the focal length f of the entire system, a value obtained by dividing the radius of curvature $R_7$ of the stuck surface of the fourth and fifth lenses by f, a value obtained by dividing the spacing $T_{34}$ between the third and fourth lenses by f, a value obtained by dividing the value $A_3$ which is a value of having applied the asphericity degree A of the equation ⑦ to the third lens, by f, and the electron gun-side asphericity $B_6$ of the sixth lens represented by the equation ⑩, with respect to each embodiment. All the embodiments satisfy the following relationships:

$v_5 < 37.0$ $N_5 \geq 1.6$ $1.5 < R_2/f < 2.5$ $0.5 < R_7/f < 1.0$ $0.2 < T_{34}/f < 0.3$ $0.2 < T_{67}/f < 0.4$ $-0.06 < A_3/f < -0.01$ $-0.07 < A_6/f < -0.04$ $-1.6 < B_6 < -1.0$ According to the above embodiments, high focusing performance and wide field angle were attained by using aspherical lenses and achromatic lenses. As a result, good MTF was obtained nearly throughout the entire region of relative field angle and about 72% MTF obtained at the center of the 1000 TV-line image plane. Further, the field angle could be widened from about 50 degrees up to 64.4 degrees, thus permitting a great shortening of the projection distance, with the result that it became possible to reduce the size of the set. Besides, a sufficient edge brightness could be ensured, which was about 42% at a relative field angle of 90%. Further, it became possible to realize the reduction in size of the lens aperture and the reduction of cost.

Table 9 shows lens data in a seventh embodiment. This lens, having a magnification of 9.5X, is for projection onto a 55-inch screen. It has an F-number of 1.2, a focal length of 92.5 mm and a field angle of 70 degrees.

In the above construction, high focusing performance and wide field angle are attained by using aspherical surfaces of the third, sixth and seventh lenses, and chromatic aberration is reduced by the first, second, fourth and fifth lenses. Further, the diaphragm disposed between the fifth and the sixth lens functions to reduce flare occurring at the image plane edge portion. The space between the seventh lens and the Braun tube glass is filled with coolant which functions to suppress the increase in temperature of the Braun tube glass.

The fluorescent screen of the Braun tube glass is convexly curved toward the electron gun. This is effective in introducing the light at the image plane edge portion into lens as much as possible to increase the edge brightness and also is effective in reducing the aberration of image field curvature. As a result, 37% edge brightness was ensured at a relative field angle of 90%.

Table 10 shows lens data in an eight embodiment. This lens is also 9.5X in magnification and is for projection onto a 55-inch screen, having an F-number of 1.2, a focal length of 92.5 mm and a field angle of 70 degrees. 37% edge brightness was ensured at a relative field angle of 90%.

According to this embodiment, high focusing performance and wide field angle are realized by using the aspherical lens technique and achromatic lenses, and the lens size is reduced by shortening the focal length. As a result, it is possible to widen the field angle from about 50 degrees commonly adopted heretofore up to about 70 degrees and shorten the projection distance to a great extent. Besides, notwithstanding the increase in field angle, a sufficient edge brightness can be ensured, which is about 37% at a relative field angle of 90%. Further, the lens aperture is 130 mm, thus permitting the reduction of both size and cost.

TABLE 1

| | | Paraxial System | | | | |
|---|---|---|---|---|---|---|
| Screen | | Curvature Radius RD (mm) 0.0 | Aperture Radius (mm) 700.0 | Gap between Surfaces (mm) | Refractive Index (545 nm) | Quality of Material (Abbe's No.) |
| | | | | 1008.0 | 1.0 | |
| 1st, 2nd | S1 | 445.103 | 51.0 | | | |
| | | | | 3.0 | 1.6242 | F2 (36.30) |
| Lens | S2 | 200.0 | 51.0 | | | |
| | | | | 13.0 | 1.6229 | SK 16 (60.34) |
| | S3 | 1081.915 | 51.0 | | | |

TABLE 1-continued

| Screen | | Paraxial System Curvature Radius RD (mm) 0.0 | Aperture Radius (mm) 700.0 | Gap between Surfaces (mm) | Refractive Index (545 nm) | Quality of Material (Abbe's No.) |
|---|---|---|---|---|---|---|
| | | | | 2.0 | 1.0 | |
| 3rd Lens | S4 | 76.114 | 42.0 | | | |
| | | | | 8.6151 | 1.4934 | PMMA |
| | S5 | 70.242 | 42.0 | | | |
| | | | | 25.530 | 1.0 | |
| 4th, 5th | S6 | 99.834 | 40.0 | | | |
| | | | | 28.0 | 1.6229 | SK 16 (60.34) |
| Lens | S7 | −65.0 | 40.0 | | | |
| | | | | 2.4 | 1.7921 | FD 11 (25.70) |
| | S8 | −101.368 | 40.0 | | | |
| | | | | 8.0 | 1.0 | |
| Aperature | S9 | 0.0 | 35.5 | | | |
| | | | | 26.450 | 1.0 | |
| 6th Lens | S10 | −235.523 | 40.0 | | | |
| | | | | 8.55 | 1.4936 | PPMA |
| | S11 | −103.931 | 40.5 | | | |
| | | | | 26.0 | 1.0 | |
| 7th Lens | S12 | −43.561 | 44.0 | | | |
| | | | | 3.67 | 1.4936 | PMMA |
| | S13 | −65.0 | 46.0 | | | |
| Coolant | | | | 10.9 | 1.4446 | EG + GL |
| Glass | | 0.0 | 70.0 | 13.4 | 1.5399 | |
| | | −341.280 | 70.0 | | | |

| Fluorecent Surface Aspherical Coefficient | | CC | AD | AE | AF | AG |
|---|---|---|---|---|---|---|
| 3rd Lens | S4 | −6.83879 | $6.1196 \times 10^{-7}$ | $-1.2286 \times 10^{-9}$ | $3.5442 \times 10^{-13}$ | $-3.7147 \times 10^{-17}$ |
| | S5 | 0.813655 | $1.1438 \times 10^{-6}$ | $-7.2597 \times 10^{-10}$ | $3.0261 \times 10^{-13}$ | $-6.2497 \times 10^{-17}$ |
| 6th Lens | S10 | 24.8279 | $1.1732 \times 10^{-6}$ | $9.1152 \times 10^{-10}$ | $2.9704 \times 10^{-13}$ | $-3.3453 \times 10^{-16}$ |
| | S11 | −10.6732 | $7.6570 \times 10^{-7}$ | $1.3801 \times 10^{-9}$ | $3.5329 \times 10^{-13}$ | $-3.0965 \times 10^{-16}$ |
| 7th Lens | S12 | −2.31351 | $-7.9612 \times 10^{-7}$ | $3.8242 \times 10^{-10}$ | $-5.5325 \times 10^{-13}$ | $2.2152 \times 10^{-16}$ |
| Fluorecent Surface | | 4.58135 | $2.3355 \times 10^{-7}$ | $-1.1824 \times 10^{-10}$ | $1.4486 \times 10^{-14}$ | $-5.5873 \times 10^{-19}$ | f = 95.085

TABLE 3

| Screen | | Paraxial System Curvature Radius RD (mm) 0.0 | Aperture Radius (mm) 700.0 | Gap between Surfaces (mm) | Refractive Index (545 nm) | Quality of Material (Abbe's No.) |
|---|---|---|---|---|---|---|
| | | | | 1008.0 | 1.0 | |
| 1st, 2nd | S1 | 995.773 | 51.0 | | | |
| | | | | 3.0 | 1.6242 | F2 (36.30) |
| Lens | S2 | 200.0 | 51.0 | | | |
| | | | | 13.0 | 1.6229 | SK 16 (60.34) |
| | S3 | −953.211 | 51.0 | | | |
| | | | | 2.0 | 1.0 | |
| 3rd Lens | S4 | 72.188 | 42.0 | | | |
| | | | | 8.61517 | 1.4934 | PMMA |
| | S5 | 65.172 | 42.0 | | | |
| | | | | 26.237 | 1.0 | |
| 4th, 5th | S6 | 100.160 | 40.0 | | | |
| | | | | 28.0 | 1.6229 | SK 16 (60.34) |
| Lens | S7 | −65.0 | 40.0 | | | |
| | | | | 2.4 | 1.7921 | FD 11 (25.70) |
| | S8 | −102.162 | 40.0 | | | |
| | | | | 8.0 | 1.0 | |
| Aperture | S9 | 0.0 | 35.5 | | | |
| | | | | 24.732 | 1.0 | |
| 6th Lens | S10 | −217.799 | 40.0 | | | |
| | | | | 8.55 | 1.4934 | PMMA |
| | S11 | −104.931 | 39.0 | | | |
| | | | | 26.0 | 1.0 | |
| 7th Lens | S12 | −44.191 | 44.0 | | | |
| | | | | 3.67 | 1.4934 | PMMA |
| | S13 | −70.0 | 46.0 | | | |
| Coolant | | | | 10.9 | 1.4446 | EG + GL |

TABLE 3-continued

|  |  | Paraxial System | | | | |
|---|---|---|---|---|---|---|
| Screen |  | Curvature Radius RD (mm) 0.0 | Aperture Radius (mm) 700.0 | Gap between Surfaces (mm) | Refractive Index (545 nm) | Quality of Material (Abbe's No.) |
| Glass |  | 0.0 −341.280 | 70.0 70.0 | 13.4 | 1.5399 |  |

Fluorecent Surface
Aspherical Coefficient

|  |  | CC | AD | AE | AF | AG |
|---|---|---|---|---|---|---|
| 3rd Lens | S4 | −4.69768 | $6.5614 \times 10^{-8}$ | $-1.3028 \times 10^{-9}$ | $4.6592 \times 10^{-13}$ | $-5.6170 \times 10^{-17}$ |
|  | S5 | 0.435757 | $-1.3933 \times 10^{-6}$ | $-1.0640 \times 10^{-9}$ | $5.2906 \times 10^{-13}$ | $-9.1357 \times 10^{-17}$ |
| 6th Lens | S10 | 17.6203 | $1.1842 \times 10^{-6}$ | $1.1907 \times 10^{-9}$ | $1.61449 \times 10^{-13}$ | $-3.2794 \times 10^{-16}$ |
|  | S11 | −11.6155 | $8.5078 \times 10^{-7}$ | $1.5334 \times 10^{-9}$ | $3.9254 \times 10^{-13}$ | $-3.0965 \times 10^{-16}$ |
| 7th Lens | S12 | −2.00210 | $-5.2545 \times 10^{-7}$ | $5.9297 \times 10^{-10}$ | $-8.5108 \times 10^{-13}$ | $3.5374 \times 10^{-16}$ |
| Fluorecent Surface |  | 4.58135 | $2.3355 \times 10^{-7}$ | $-1.1824 \times 10^{-10}$ | $1.4486 \times 10^{-14}$ | $-5.5873 \times 10^{-19}$ | f = 94.630

TABLE 4

|  |  | Paraxial System | | | | |
|---|---|---|---|---|---|---|
| Screen |  | Curvature Radius RD (mm) 0.0 | Aperture Radius (mm) 700.0 | Gap between Surfaces (mm) | Refractive Index (545 nm) | Quality of Material (Abbe's No.) |
|  |  |  |  | 1008.0 | 1.0 |  |
| 1st, 2nd | S1 | 994.840 | 51.0 |  |  |  |
|  |  |  |  | 3.0 | 1.6242 | F2 (36.30) |
| Lens | S2 | 170.0 | 51.0 |  |  |  |
|  |  |  |  | 13.0 | 1.6229 | SK 16 (60.34) |
|  | S3 | −952.569 | 51.0 |  |  |  |
|  |  |  |  | 2.0 | 1.0 |  |
| 3rd Lens | S4 | 72.187 | 42.0 |  |  |  |
|  |  |  |  | 8.6151 | 1.4934 | PMMA |
|  | S5 | 65.174 | 42.0 |  |  |  |
|  |  |  |  | 26.239 | 1.0 |  |
| 4th, 5th | S6 | 100.160 | 40.0 |  |  |  |
|  |  |  |  | 28.0 | 1.6229 | SK 16 (60.34) |
| Lens | S7 | −65.0 | 40.0 |  |  |  |
|  |  |  |  | 2.4 | 1.7921 | FD 11 (25.70) |
|  | S8 | −102.162 | 40.0 |  |  |  |
|  |  |  |  | 8.0 | 1.0 |  |
| Aperture | S9 | 0.0 | 35.5 |  |  |  |
|  |  |  |  | 24.731 | 1.0 |  |
| 6th Lens | S10 | −217.793 | 40.0 |  |  |  |
|  |  |  |  | 8.55 | 1.4934 | PMMA |
|  | S11 | −104.932 | 39.0 |  |  |  |
|  |  |  |  | 26.0 | 1.0 |  |
| 7th Lens | S12 | −44.189 | 44.0 |  |  |  |
|  |  |  |  | 3.67 | 1.4934 | PMMA |
|  | S13 | −70.0 | 46.0 |  |  |  |
| Coolant |  |  |  | 10.9 | 1.4446 | EG + GL |
| Glass |  | 0.0 −341.280 | 70.0 70.0 | 13.4 | 1.5399 |  |

Fluorecent Surface
Aspherical Coefficient

|  |  | CC | AD | AE | AF | AG |
|---|---|---|---|---|---|---|
| 3rd Lens | S4 | 4.9754 | $6.5598 \times 10^{-8}$ | $-1.3028 \times 10^{-9}$ | $4.692 \times 10^{-13}$ | $-5.6169 \times 10^{-17}$ |
|  | S5 | 0.435821 | $-1.3933 \times 10^{-6}$ | $-1.0640 \times 10^{-9}$ | $5.2906 \times 10^{-13}$ | $-9.1350 \times 10^{-17}$ |
| 6th Lens | S10 | 17.6170 | $1.1842 \times 10^{-6}$ | $1.1907 \times 10^{-9}$ | $1.6146 \times 10^{-13}$ | $-3.2795 \times 10^{-16}$ |
|  | S11 | −11.6160 | $8.5078 \times 10^{-7}$ | $1.5334 \times 10^{-9}$ | $3.9254 \times 10^{-13}$ | $-3.0965 \times 10^{-16}$ |
| 7th Lens | S12 | 2.00175 | $-5.2509 \times 10^{-7}$ | $5.9289 \times 10^{-10}$ | $-8.5120 \times 10^{-13}$ | $3.5380 \times 10^{-16}$ |
| Fluorecent Surface |  | 4.58135 | $2.3355 \times 10^{-7}$ | $-1.1824 \times 10^{-10}$ | $1.4486 \times 10^{-14}$ | $-5.5873 \times 10^{-19}$ | f = 94.630

TABLE 5

| Screen | | Paraxial System Curvature Radius RD (mm) 0.0 | Aperture Radius (mm) 700.0 | Gap between Surfaces (mm) | Refractive Index (545 nm) | Quality of Material (Abbe's No.) |
|---|---|---|---|---|---|---|
| | | | | 1008.0 | 1.0 | |
| 1st, 2nd | S1 | 1109.607 | 51.0 | | | |
| | | | | 3.0 | 1.6242 | F2 (36.30) |
| Lens | S2 | 200.0 | 51.0 | | | |
| | | | | 13.0 | 1.6229 | SK 16 (60.34) |
| | S3 | −1087.537 | 51.0 | | | |
| | | | | 2.0 | 1.0 | |
| 3rd Lens | S4 | 71.966 | 42.0 | | | |
| | | | | 8.6151 | 1.4934 | PMMA |
| | S5 | 64.361 | 42.0 | | | |
| | | | | 24.721 | 1.0 | |
| 4th, 5th | S6 | 101.790 | 40.0 | | | |
| | | | | 28.0 | 1.6229 | SK 16 (60.34) |
| Lens | S7 | −65.0 | 40.0 | | | |
| | | | | 2.4 | 1.7472 | FD 13 (27.76) |
| | S8 | −103.096 | 40.0 | | | |
| | | | | 8.0 | 1.0 | |
| Aperture | S9 | 0.0 | 35.5 | | | |
| | | | | 25.761 | 1.0 | |
| 6th Lens | S10 | −227.600 | 40.0 | | | |
| | | | | 8.55 | 1.4934 | PMMA |
| | S11 | −103.701 | 39.0 | | | |
| | | | | 26.0 | 1.0 | |
| 7th Lens | S12 | −44.785 | 44.0 | | | |
| | | | | 3.67 | 1.4934 | PMMA |
| | S13 | −70.0 | 46.0 | | | |
| Coolant | | | | 10.9 | 1.4446 | EG + GL |
| Glass | | 0.0 | 70.0 | 13.4 | 1.5399 | |
| | | −341.280 | 70.0 | | | |

Fluorecent Surface
Asspherical Coefficient

| | | CC | AD | AE | AF | AG |
|---|---|---|---|---|---|---|
| 3rd Lens | S4 | −4.70777 | $7.2587 \times 10^{-8}$ | $-1.3024 \times 10^{-9}$ | $4.6224 \times 10^{-13}$ | $-5.6527 \times 10^{-17}$ |
| | S5 | 0.449262 | $-1.3962 \times 10^{-6}$ | $-1.0406 \times 10^{-9}$ | $5.2078 \times 10^{-13}$ | $-9.5747 \times 10^{-17}$ |
| 6th Lens | S10 | 23.2748 | $1.5035 \times 10^{-6}$ | $1.2597 \times 10^{-9}$ | $1.7379 \times 10^{-13}$ | $-3.5285 \times 10^{-16}$ |
| | S11 | −13.3215 | $9.4531 \times 10^{-7}$ | $1.7038 \times 10^{-9}$ | $4.3616 \times 10^{-13}$ | $-3.8679 \times 10^{-16}$ |
| 7th Lens | S12 | −2.05997 | $-4.6055 \times 10^{-7}$ | $5.3014 \times 10^{-10}$ | $-8.7862 \times 10^{-13}$ | $3.6244 \times 10^{-16}$ |
| Fluorecent Surface | | 4.58135 | $2.3355 \times 10^{-7}$ | $-1.1824 \times 10^{-10}$ | $1.4486 \times 10^{-14}$ | $-5.5873 \times 10^{-19}$ | f = 94.412

TABLE 6

| Screen | | Paraxial System Curvature Radius RD (mm) | Aperture Radius (mm) 700.0 | Gap between Surfaces (mm) | Refractive Index (545 nm) | Quality of Material (Abbe's No.) |
|---|---|---|---|---|---|---|
| | | | | 1008.0 | 1.0 | |
| 1st, 2nd | S1 | 1144.057 | 51.0 | | | |
| | | | | 3.0 | 1.6242 | F2 (36.30) |
| Lens | S2 | 200.0 | 51.0 | | | |
| | | | | 13.0 | 1.6229 | SK 16 (60.34) |
| | S3 | −870.202 | 51.0 | | | |
| | | | | 2.0 | 1.0 | |
| 3rd Lens | S4 | 71.254 | 42.0 | | | |
| | | | | 8.6151 | 1.4934 | PMMA |
| | S5 | 65.501 | 42.0 | | | |
| | | | | 26.387 | 1.0 | |
| 4th, 5th | S6 | 97.203 | 40.0 | | | |
| | | | | 28.0 | 1.6229 | SK 16 (60.34) |
| Lens | S7 | −65.0 | 40.0 | | | |
| | | | | 2.4 | 1.7472 | FD 13 (27.76) |
| | S8 | −108.879 | 40.0 | | | |
| | | | | 8.0 | 1.0 | |
| Aperture | S9 | 0.0 | 35.5 | | | |
| | | | | 24.006 | 1.0 | |
| 6th Lens | S10 | −185.615 | 40.0 | | | |
| | | | | 7.35 | 1.4934 | PMMA |

TABLE 6-continued

Paraxial System

| Screen | | Curvature Radius RD (mm) | Aperture Radius (mm) 700.0 | Gap between Surfaces (mm) | Refractive Index (545 nm) | Quality of Material (Abbe's No.) |
|---|---|---|---|---|---|---|
| | S11 | −95.741 | 39.07 | | | |
| | | | | 26.0 | 1.0 | |
| 7th Lens | S12 | −44.698 | 44.0 | | | |
| | | | | 3.67 | 1.4934 | PMMA |
| | S13 | −70.0 | 46.0 | | | |
| Coolant | | | | 10.9 | 1.4446 | EG + GL |
| Glass | | 0.0 | 70.0 | 13.4 | 1.5399 | |
| | | −341.280 | 70.0 | | | |

Fluorecent Surface Aspherical Coefficient

| | | CC | AD | AE | AF | AG |
|---|---|---|---|---|---|---|
| 3rd Lens | S4 | −4.63485 | 9.0648 $\times 10^{-8}$ | −1.3186 $\times 10^{-9}$ | 4.6609 $\times 10^{-13}$ | −5.4174 $\times 10^{-17}$ |
| | S5 | 0.564500 | −1.4683 $\times 10^{-6}$ | −1.1313 $\times 10^{-9}$ | 5.6525 $\times 10^{-13}$ | −1.0904 $\times 10^{-16}$ |
| 6th Lens | S10 | 14.9310 | 1.1129 $\times 10^{-6}$ | 1.6663 $\times 10^{-9}$ | 2.1983 $\times 10^{-13}$ | −4.4776 $\times 10^{-16}$ |
| | S11 | −7.97487 | 8.9574 $\times 10^{-7}$ | 1.8331 $\times 10^{-9}$ | 5.5398 $\times 10^{-13}$ | −4.9159 $\times 10^{-16}$ |
| 7th Lens | S12 | −2.66270 | −1.2661 $\times 10^{-6}$ | 7.0506 $\times 10^{-10}$ | −7.5303 $\times 10^{-13}$ | 2.8693 $\times 10^{-16}$ |
| Fluorecent Surface | | 4.58135 | 2.3355 $\times 10^{-7}$ | −1.1824 $\times 10^{-10}$ | 1.4486 $\times 10^{-14}$ | −5.5873 $\times 10^{-19}$ |

$f = 93.869$

TABLE 7

Paraxial System

| Screen | | Curvature Radius RD (mm) 0.0 | Aperture Radius (mm) 700.0 | Gap between Surfaces (mm) | Refractive Index (545 nm) | Quality of Material (Abbe's No.) |
|---|---|---|---|---|---|---|
| | | | | 1008.0 | 1.0 | |
| 1st, 2nd | S1 | 1371.482 | 49.5 | | | |
| | | | | 3.0 | 1.6242 | F2 (36.30) |
| Lens | S2 | 200.0 | 49.5 | | | |
| | | | | 13.0 | 1.6229 | SK 16 (60.34) |
| | S3 | −1218.133 | 49.5 | | | |
| | | | | 2.0 | 1.0 | |
| 3rd Lens | S4 | 72.532 | 49.5 | | | |
| | | | | 8.6151 | 1.4934 | PMMA |
| | S5 | 65.306 | 49.5 | | | |
| | | | | 24.600 | 1.0 | |
| 4th, 5th | S6 | 104.387 | 39.0 | | | |
| | | | | 26.0 | 1.6229 | SK 16 (60.34) |
| Lens | S7 | −55.0 | 39.0 | | | |
| | | | | 2.4 | 1.6242 | F2 (36.30) |
| | S8 | −124.609 | 39.0 | | | |
| | | | | 8.0 | 1.0 | |
| Aperture | S9 | 0.0 | 32.0 | | | |
| | | | | 26.819 | 1.0 | |
| 6th Lens | S10 | −213.740 | 42.0 | | | |
| | | | | 7.35 | 1.4934 | PMMA |
| | S11 | −101.141 | 42.0 | | | |
| | | | | 30.0 | 1.0 | |
| 7th Lens | S12 | −48.145 | 45.0 | | | |
| | | | | 3.67 | 1.4934 | PMMA |
| | S13 | −70.0 | 47.0 | | | |
| Coolant | | | | 10.9 | 1.4446 | EG + GL |
| Glass | | 0.0 | 70.0 | 13.4 | 1.5399 | |
| | | −341.280 | 70.0 | | | |

Fluorecent Surface Aspherical Coefficient

| | | CC | AD | AE | AF | AG |
|---|---|---|---|---|---|---|
| 3rd Lens | S4 | −5.17223 | 9.6934 $\times 10^{-8}$ | −1.3130 $\times 10^{-9}$ | 4.6534 $\times 10^{-13}$ | −5.4223 $\times 10^{-17}$ |
| | S5 | 0.601181 | −1.4957 $\times 10^{-6}$ | −1.1439 $\times 10^{-9}$ | 5.9011 $\times 10^{-13}$ | −1.2300 $\times 10^{-16}$ |
| 6th Lens | S10 | −4.25981 | 1.3771 $\times 10^{-6}$ | 1.7486 $\times 10^{-9}$ | 1.3887 $\times 10^{-13}$ | −4.3040 $\times 10^{-16}$ |
| | S11 | −11.4795 | 1.1659 $\times 10^{-6}$ | 2.0934 $\times 10^{-9}$ | 6.7476 $\times 10^{-13}$ | −5.7628 $\times 10^{-16}$ |

TABLE 7-continued

| Screen | | Paraxial System | | | | |
|---|---|---|---|---|---|---|
| | | Curvature Radius RD (mm) | Aperture Radius (mm) | Gap between Surfaces (mm) | Refractive Index (545 nm) | Quality of Material (Abbe's No.) |
| | | 0.0 | 700.0 | | | |
| 7th Lens | S12 | −3.89908 | −1.6263 × $10^{-6}$ | 9.5345 × $10^{-10}$ | −6.6968 × $10^{-13}$ | 2.2835 × $10^{-16}$ |
| Fluorecent Surface | | 4.58135 | 2.3355 × $10^{-7}$ | −1.1824 × $10^{-10}$ | 1.4486 × $10^{-14}$ | −5.5873 × $10^{-19}$ | f = 96.273

TABLE 8

| | Table 1 | Table 3 | Table 4 | Table 5 | Table 6 | Table 7 |
|---|---|---|---|---|---|---|
| $V_5$ | 25.70 | 25.70 | 25.70 | 27.76 | 27.76 | 36.30 |
| $N_5$ | 1.792 | 1.792 | 1.792 | 1.747 | 1.747 | 1.624 |
| $R_2/f$ | 2.103 | 2.113 | 1.796 | 2.118 | 2.130 | 2.077 |
| $R_7/f$ | 0.683 | 0.686 | 0.686 | 0.688 | 0.692 | 0.571 |
| $T_{34}/f$ | 0.268 | 0.277 | 0.277 | 0.261 | 0.281 | 0.255 |
| $T_{67}/f$ | 0.273 | 0.274 | 0.274 | 0.275 | 0.277 | 0.311 |
| $A_3/f$ | −0.0224 | −0.0179 | −0.0179 | −0.0194 | −0.0173 | −0.0515 |
| $A_6/f$ | −0.0528 | −0.0438 | −0.0438 | −0.0440 | −0.0456 | −0.0663 |
| $B_6$ | −1.108 | −1.173 | −1.173 | −1.242 | −1.126 | −1.579 |

TABLE 9

| Screen | | Paraxial System | | | | |
|---|---|---|---|---|---|---|
| | | Curvature Radius RD (mm) | Aperture Radius (mm) 700.0 | Gap between Surfaces (mm) | Refractive Index (545 nm) | Quality of Material (Abbe's No.) |
| | | | | 996.2 | 1.0 | |
| 1st, 2nd | S1 | 753.724 | 65.0 | | | |
| | | | | 3.0 | 1.6242 | F2 (36.30) |
| Lens | S2 | 200.0 | 65.0 | | | |
| | | | | 15.0 | 1.6229 | $BaCD_{16}$ (60.34) |
| | S3 | 44196.7 | 65.0 | | | |
| | | | | 2.0 | 1.0 | |
| 3rd Lens | S4 | 98.5674 | 57.2 | | | |
| | | | | 8.6151 | 1.4936 | PMMA |
| | S5 | 106.493 | 49.6 | | | |
| | | | | 26.981 | 1.0 | |
| 4th, 5th | S6 | 95.0076 | 39.3 | | | |
| | | | | 26.0 | 1.6229 | $BaCD_{16}$ (60.34) |
| Lens | S7 | −60.0 | 41.1 | | | |
| | | | | 2.4 | 1.6242 | F2 (36.30) |
| | S8 | −144.070 | 41.1 | | | |
| | | | | 5.0 | 1.0 | |
| Aperture | S9 | 0.0 | 33.0 | | | |
| | | | | 34.245 | 1.0 | |
| 6th Lens | S10 | 1386.84 | 42.2 | | | |
| | | | | 7.348 | 1.4936 | PMMA |
| | S11 | −357.528 | 42.2 | | | |
| | | | | 23.557 | 1.0 | |
| 7th lens | S12 | −43.0 | 46.0 | | | |
| | | | | 3.667 | 1.4936 | PMMA |
| | S13 | −55.0 | 49.0 | | | |
| Coolant | | | | 2.37 | 1.4578 | PEG200 |
| Glass | | 0.0 | 80.0 | 15.5 | 1.5401 | |
| | | −1000.0 | 80.0 | | | |

Fluorecent Surface Aspherical Coefficient

| | | CC | AD | AE | AF | AG |
|---|---|---|---|---|---|---|
| 3rd Lens | S4 | −7.57444 | −4.9671 × $10^{-7}$ | −1.1978 × $10^{-9}$ | 5.5781 × $10^{-13}$ | −7.6181 × $10^{-17}$ |
| | S5 | 1.19740 | −1.3373 × $10^{-6}$ | −8.7742 × $10^{-10}$ | 5.8827 × $10^{-13}$ | −9.1165 × $10^{-17}$ |
| 6th Lens | S10 | −39658.1 | −1.1723 × $10^{-6}$ | −4.2830 × $10^{-10}$ | −1.6972 × $10^{-13}$ | 7.2669 × $10^{-18}$ |
| | S11 | 53.7054 | −5.5780 × $10^{-7}$ | 3.1248 × $10^{-10}$ | −3.6271 × $10^{-13}$ | 1.5937 × $10^{-16}$ |
| 7th Lens | S12 | −1.06867 | −1.0860 × $10^{-6}$ | 1.0983 × $10^{-9}$ | −5.9134 × $10^{-13}$ | 1.3166 × $10^{-16}$ |
| Fluorecent Surface | | 4.58135 | 2.3355 × $10^{-7}$ | −1.1824 × $10^{-10}$ | 1.4486 × $10^{-14}$ | −5.5873 × $10^{-19}$ | f = 92.5

TABLE 10

| Screen | | Radius Radius RD (mm) | Paraxial System Aperture Curvature (mm) 700.0 | Gap between Surfaces (mm) | Refractive Index (545 nm) | Quality of Material (Abbe's No.) |
|---|---|---|---|---|---|---|
| | | | | 996.2 | 1.0 | |
| 1st, 2nd | S1 | 793.771 | 65.0 | | | |
| | | | | 3.0 | 1.6242 | F2 (36.30) |
| Lens | S2 | 200.0 | 65.0 | | | |
| | | | | 15.0 | 1.6229 | BaCD$_{16}$ (60.34) |
| | S3 | −5179.69 | 65.0 | | | |
| | | | | 2.0 | 1.0 | |
| 3rd Lens | S4 | 99.6150 | 57.2 | | | |
| | | | | 8.6151 | 1.4936 | PMMA |
| | S5 | 106.504 | 49.6 | | | |
| | | | | 27.373 | 1.0 | |
| 4th, 5th | S6 | 95.0076 | 41.1 | | | |
| | | | | 26.0 | 1.6229 | BaCD$_{16}$ (60.34) |
| Lens | S7 | −60.0 | 41.1 | | | |
| | | | | 2.4 | 1.6242 | F2 (36.30) |
| | S8 | −141.555 | 41.1 | | | |
| | | | | 37.459 | 1.0 | |
| 6th Lens | S9 | 3476.29 | 42.2 | | | |
| | | | | 7.348 | 1.4936 | PMMA |
| | S10 | −383.703 | 42.2 | | | |
| | | | | 24.922 | 1.0 | |
| 7th Lens | S11 | −43.0 | 46.0 | | | |
| | | | | 3.667 | 1.4936 | PMMA |
| | S12 | −55.0 | 49.0 | | | |
| Coolant | | | | 2.37 | 1.4578 | PEG200 |
| Glass | | 0.0 | 80.0 | 15.5 | 1.5401 | |
| | | −1000.0 | 80.0 | | | |

| Fluorecent Surface Aspherical Coefficient | | CC | AD | AE | AF | AG |
|---|---|---|---|---|---|---|
| 3rd Lens | S4 | −9.26360 | −4.5666 × 10$^{-6}$ | −1.1902 × 10$^{-10}$ | 5.5829 × 10$^{-13}$ | −7.6719 × 10$^{-17}$ |
| 6th Lens | S10 | −39658.1 | −1.1866 × 10$^{-6}$ | 9.3983 × 10$^{-11}$ | −2.3961 × 10$^{-13}$ | −4.2016 × 10$^{-17}$ |
| | S11 | 47.7805 | −2.3347 × 10$^{-7}$ | 4.9563 × 10$^{-10}$ | −3.3129 × 10$^{-13}$ | 1.0171 × 10$^{-16}$ |
| 7th Lens | S12 | −1.43385 | −1.2399 × 10$^{-6}$ | 7.2748 × 10$^{-10}$ | −4.6141 × 10$^{-13}$ | 1.4058 × 10$^{-16}$ |
| Fluorecent Surface | | 4.58135 | 2.3355 × 10$^{-7}$ | −1.1824 × 10$^{-10}$ | 1.4486 × 10$^{-14}$ | −5.5873 × 10$^{-19}$ |

$f = 92.5$

We claim:

1. A lens system for a projection type television, comprising, successively from a screen side, a concave first lens, a convex second lens cemented to the first lens, a third lens at least one side of which is aspherical, a bi-convex fourth lens, a concave fifth lens cemented to the fourth lens, a sixth lens at least one side of which is aspherical, and a concave seventh lens having an aspherical surface.

2. A lens system for a projection type television according to claim 1, wherein Abbe's numbers at d line of the first, second, fourth and fifth lenses are v1, v2, v4 and v5, respectively, and said Abbe's numbers satisfy the relationship of v1>v2, v4>v5.

3. A lens system for a projection type television according to claim 2, wherein v5<37.0, the refractive index at 545 nm of the fifth lens is $N_5$, and $N_5 \geq 1.62$.

4. A lens system for a projection type television according to claim 1, wherein the radius of curvature of the cemented surface between the first and the second lens is $R_2$, the radius of curvature of the cemented surface between the fourth and the fifth lens is $R_7$ and the focal length of the entire system is f, wherein the following conditions are satisfied:

$$1.5 < R_2/f < 2.5$$

$$0.5 < R_7/f < 1.0.$$

5. A lens system for a projection type television according to claim 1, wherein the spacing between the third and the fourth lens is $T_{34}$ and the spacing between the sixth and the seventh lens is $T_{67}$, and the following conditions are satisfied:

$$0.2 < T_{34}/f < 0.3$$

$$0.2 < T_{67}/f < 0.4.$$

6. A lens system for a projection type television according to claim 1, wherein an asphericity degree $A_3$ of the third lens and $A_6$ of the sixth lens satisfy the following conditions:

$$-0.06 < A_3/f < -0.01$$

$$-0.07 < A_6/f < -0.04$$

where a surface shape $Z(r)$ at a distance r from an optical axis is defined as follows:

$$Z(r) = \frac{r^2/R_D}{1 + \sqrt{1 - (1 + CC)\frac{r^2}{R_D^2}}} +$$

$$AD \cdot r^4 + AE \cdot r^6 + AF \cdot r^8 + AG \cdot r^{10}$$

and using $R_D$ in the above equation, $S(r)$ is defined as follows:

$$S(r) = \frac{r^2/R_D}{1 + \sqrt{1 - \frac{r^2}{R_D^2}}}$$

and with $Z(r)$, $S(r)$ and aperture radius on the lens screenside surface being $Z_1(r)$, $S_1(r)$ and $r_1$, respectively, and those on the electron gun-side surface being $Z_2(r)$, $S_2(r)$ and $r_2$, respectively, the asphericity degree A is defined as:

$$A = \{Z_1(r_1) - S_1(r_1)\} - \{Z_2(r_2) - S_2(r_2)\}.$$

7. A lens system for a projection type television according to claim 6, wherein an asphericity amount $B_6$ at the electron gun-side surface of the sixth lens satisfies the following condition:

$$-1/6 < B_6 < -1.0$$

the asphericity amount B being defined as follows $$B_6 = -\frac{Z(r_0) - S(r_0)}{S(r_0)}$$

* * * * *